Patented Oct. 31, 1944

2,361,756

UNITED STATES PATENT OFFICE 2,361,756

OINTMENTS AND THE LIKE

George W. Fiero, Snyder, N. Y.

No Drawing. Application March 31, 1942,
Serial No. 437,033

6 Claims. (Cl. 167—63)

This invention relates to salves, ointments and like skin-treating preparations containing phosphated and sulfated derivatives of hydrogenated castor oil such as are disclosed in my copending application Serial No. 291,498, filed on August 23, 1939, now Patent No. 2,300,780, of which the present application is a continuation-in-part.

At the present time the commonest ointment base is petrolatum, which is used largely because of its stability and compatibility with the usual medicaments. The hydrophobic character of petrolatum is disadvantageous, however, in that perspiration and other discharges from the skin act as a barrier to effective contact of the ointment with the skin. It has been recognized, therefore, that a more hydrophilic base for ointments would be highly desirable, and accordingly lanolin has been substituted for petrolatum in ointments to a considerable extent. However, lanolin has certain deficiencies as an ointment base for general application, notably its tendency to rancidify, its tendency to form water-in-oil emulsions, its disagreeable consistency and odor, and the difficulty of washing it off the skin.

Accordingly, it is an object of this invention to provide a novel hydrophilic base for salves, ointments, creams and the like.

Another object is to prepare such a base having an approximately neutral or very slightly acid reaction.

Still another object is to provide novel salves, creams, ointments and the like which will be stable against rancidity and against separation of ingredients during storage.

Another object is to provide ointments and the like which may be readily removed from the skin by gentle washing with water.

Still further objects are to provide novel bases of this type which are non-irritating to the skin, readily compatible with practically all medicaments, and which lend themselves to automatic manufacturing processes.

The above objects are secured by this invention in ointments, salves, cerates, creams and the like, containing as their bases sulfated and/or phosphated hydrogenated castor oils. The products so prepared range from clinging, adhesive salves and ointments; through products of a smoother and more unctuous nature; to creams and vanishing creams, accordingly as more or less of modifying agents are added to the compositions. A wide variety of medicaments may be incorporated in ointment bases prepared in accordance with this invention, since these bases may be made with practically any degree of alkalinity or acidity required, and are compatible with all the usual medicaments incorporated into salves and ointments. Preparations according to this invention are pervious to perspiration and other skin secretions so as to insure proper contact of the ointment with the skin. Compositions prepared in accordance with this invention are characterized in that they are highly stable both to rancidity and separation in storage, and are non-irritating and readily removable by gentle washing with water.

More particularly with regard to the sulfated and phosphated castor oils suitable as bases for the salves and ointments of this invention, such compounds may be prepared as desscribed in my copending application above referred to. In general the ointment bases may be derived from castor oils of various degrees of hydrogenation, may contain varying percentages of combined $SO_3$ or $P_2O_5$ and of moisture, and may be neutralized to varying degrees by means of various basic cations. All of these factors are interdependent and are preferably adjusted to secure a product which will melt at as high as possible a temperature, preferably above 25° C., and which will be non-irritating to the skin. The original oil should be hydrogenated to reduce the iodine value below 11, and preferably below 4, the lower iodine values resulting in harder products. The $SO_3$ (or $P_2O_5$) content should be as high as possible, preferably above 6, and still more preferably above 10 to enhance the hydrophilic properties of the salve base. The moisture content may be as high as 30 or 40%, higher percentages resulting in considerably softer products. The substituted sulfo- and phosphato-groups in the castor oil base may be neutralized by suitable basic cations such as sodium, potassium, lithium, ammonium, organic amine cations and the like, sodium being preferred in that it results in harder products of superior emulsifying power. This neutralization is preferably carried out to such a degree as to yield pH values substantially the same as that of the skin, viz., 6. However, the pH may be varied between about 5.5 and about 9.5, higher values of pH resulting in harder products. As above stated, the various factors may be concurrently adjusted to provide the results desired; for instance, higher degrees of hydrogenation and sulfonation will permit the inclusion of higher percentages of water and a lower pH without resulting in undesirably soft products.

As stated above, the compositions prepared in accordance with this invention may vary in properties from a very adhesive salve which is obtained when a minimum of other materials are added to the sulfated oil; through preparations of a smoother character produced by the addition of unctuous substances such as mineral, vegetable and animal oils, fats, waxes and the like; to emulsion creams produced by the addition of water and other hydrophilic substances. Referring first to the preparations in which the sulfated and/or phosphated hydrogenated castor oil is used undiluted by any modifying agents, this material possesses a peculiar stickiness which is very advantageous when it is desired to produce an ointment which will adhere tenaciously to the skin. Preparations of this sort may be made by simply incorporating the desired medicament with the sulfated hydrogenated castor oil by manipulation with a spatula and pill tile, or by trituration with molten sulfated or phosphated hydrogenated castor oil, the latter method being the simplest. In both cases a small amount of the sulfated oil is preferably first incorporated with the medicament and then the balance of the base is added. The sulfated products used in this invention lend themselves particularly well to large scale automatic manufacturing processes, since the ointments after having been prepared may be poured while hot and allowed to cool in ointment jars without the risk of any separation of solidifiers or medicaments, which remain well suspended or dissolved in the base.

For many ointments, a smoother, less adhesive base is desired and this result can be brought about by the addition of suitable unctuous substances such as petrolatum, liquid petrolatum, fats and fixed oils, lanolin, glycerin, or glycols and glycol esters to the sulfated and/or phosphated castor oil base. The method of incorporation may be varied and in general the simplest way is to prepare a mixture of the base and the unctuous substance and thereafter to incorporate the desired medicaments into the mixture. Often, however, slightly better dispersion is obtained if the medicament is triturated with the castor oil base and the unctuous substance subsequently added. The amount of unctuous substance may vary with the individual ointment. For instance, 25% of petrolatum will form a smooth ointment with sulfated and phosphated castor oil bases of this invention; and the petrolatum may be incorporated in amounts up to about 75% without impairing the hydrophillic properties of the bases.

For many purposes, an emulsified oil base in the nature of a cream or vanishing cream type base is indicated. The sulfonated and/or phosphated bases of this invention are admirably suited to the manufacture of such emulsified creams, the simplest type being constituted of the sulfonated base in admixture with water and an unctuous material such as petrolatum, or animal, vegetable and mineral oils, fats, fatty alcohols, fatty alcohol esters, and waxes. The amounts of these constituents may be varied within wide ranges, the base being added in general in approximately the same quantity as the amount of unctuous constituent, such as petrolatum, included in the composition. However, lesser amounts of base may be employed, as in the manufacture of cold creams, vanishing creams and the like. The water content may be as much as 70% of the total mixture. Likewise these emulsified bases may include other emulsifying agents such as diethylene glycol monostearate, glyceryl monostearate, triethanolamine and its soaps, cholesterol, lanolin and the like some of these materials such as diethylene glyc monostearate imparting semi-vanishing prope ties to the ointments containing them. Su emulsified preparations are most readily pr pared by melting the base, mixing in the petrol tum or other unctuous modifying agent a thereafter stirring in the desired amount of w ter which must, of course, be preliminarily heat to at least the same temperature as the mixtu of base and petrolatum. Agitation results a very good emulsion which is compatible wit most medicaments. In contrast with the usu preparations of this sort, most of the emulsior prepared in accordance with this invention ten to assume the form of oil-in-water, rather tha water-in-oil, emulsions, and therefore penetrat through the skin secretions in a very much mor efficient manner.

Compositions according to this invention ma be prepared for a wide variety of uses and ma contain a wide variety of medicaments and othe treating agents. The inert character of the sul fated and/or phosphated bases, and the fact tha the pH thereof may be adjusted over a consid erable range, renders them compatible with a large variety of medicaments. Ointments in ac cordance with this invention have been prepare containing benzoic acid, boric acid, tannic acid belladonna, Burow's solution, chrysarobin, nut gall, ammoniated mercury, strong mercury, mild mercury, iodine, phenol, pine tar, sulfur, zinc oxide, benzoic acid, calamine, camphor, capsi cum, salicylic acid, mercurous chloride, colloidal mercurous chloride, mercuric nitrate, red mer curic oxide, ichthammol, menthol, coal tar, birch tar, potassium iodine, resorcinol, scarlet red, mustard, sulfanilamide, sulfathiazole, sulfadia zene, stramonium, alkaline sulfur, and zinc stearate.

With the above discussion in mind there are given herewith examples of ointments and the like made in accordance with the present invention, all parts given being by weight. The term "sulfated hydrogenated castor oil" will be used with great frequency in these examples and will hereinafter be abbreviated as "SHCO."

EXAMPLE I

*Simple adhesive ointment*

A sulfated hydrogenated castor oil derived from a castor oil having an iodine value of 3 prior to its sulfation and containing 10% combined $SO_3$ provides a very strongly adhesive ointment which may be applied to the skin, and which when so applied adheres tenaciously thereto. This ointment may be optionally applied to the skin after the skin has been moistened and also a small amount of water may be rubbed into the ointment after it has been applied to the skin so as to promote the penetration of the ointment into the skin. This ointment may, of course, be used as a carrier for any of a very large number of medicinal and cosmetic agents.

EXAMPLE II

*Smooth simple ointment*

| | Parts |
|---|---|
| SHCO | 75 |
| White petrolatum | 25 |

These materials were melted and triturated together and formed a smooth ointment base readily removable from the skin by simple washing with water.

EXAMPLE III

Emulsified simple ointment

| | Parts |
|---|---|
| SHCO | 29 |
| White petrolatum | 28 |
| Distilled water | 45 |

The SHCO and petrolatum were melted together, the water was heated to the same temperature as the melted ingredients and was added to the molten mass with agitation. There resulted a smooth cream.

EXAMPLE IV

Belladonna ointment

| | Parts |
|---|---|
| Pilular extract of Belladonna | 10 |
| SHCO | 25 |
| Petrolatum | 25 |
| Distilled water | 40 |

The Belladonna extract was triturated with a small portion of the SHCO in molten state, followed by addition of the balance of the SHCO, also molten, and the petrolatum. The water was heated to the same temperature as the molten mixture and was added thereto with trituration.

EXAMPLE V

Chrysarobin ointment

| | Parts |
|---|---|
| Chrysarobin | 6 |
| Simple ointment prepared as described in Example III | 94 |

These materials were triturated together, forming a stable preparation of chrysarobin.

EXAMPLE VI

Nutgall ointment

| | Parts |
|---|---|
| Nutgall | 20 |
| Glycerin | 20 |
| SHCO | 60 |

The nutgall was triturated with glycerin and thereafter the SHCO was melted and incorporated into the mixture. This ointment was especially adapted for the treatment of burns, in view of the fact that it was readily and quickly removable by gentle washing with water.

EXAMPLE VII

Yellow mercuric oxide ointment

| | Parts |
|---|---|
| Yellow mercuric oxide | 1 |
| Liquid petrolatum | 1 |
| SHCO | 98 |

The oxide was triturated with the liquid petrolatum until smooth and then incorporated into the SHCO. The resultant ointment was especially adapted for use in eye infections by reasons of its mild, non-irritating character and its gradual solubility in tear secretions.

EXAMPLE VIII

Pine tar ointment

| | Parts |
|---|---|
| Pine tar | 50 |
| Yellow wax | 20 |
| SHCO | 30 |

The wax, pine tar and SHCO were separately melted, the wax was added to the melted SHCO, and thereafter the pine tar was incorporated with agitation.

EXAMPLE IX

Compound ointment of benzoic acid

| | Parts |
|---|---|
| Benzoic acid | 12 |
| Salicylic acid | 6 |
| SHCO | 82 |

The SHCO was melted and the benzoic acid and salicylic acid were incorporated therein by trituration. This ointment was designed for the treatment of athlete's foot and was particularly advantageous for this purpose in that the material was highly adhesive and penetrated the skin without interference from perspiration or other secretions.

EXAMPLE X

Cosmetic cream

| | Parts |
|---|---|
| White wax | 15 |
| Liquid petrolatum (heavy) | 50 |
| Distilled water | 30 |
| SHCO | 1 |

The cream was prepared by melting the wax, adding the liquid petrolatum and mixing this hot solution with a solution of the SHCO in the water heated to the same temperature. The mixture was agitated for a few seconds with a fast mechanical mixer and thereafter permitted to cool, with occasional stirring by hand. The resulting cream was stored for 1 year and showed no separation or other deterioration during that time.

EXAMPLE XI

Vanishing cream

| | Parts |
|---|---|
| Stearic acid | 15 |
| Distilled water | 60 |
| SHCO | 2.5 |

The water was heated and the SHCO dissolved therein. The stearic acid was melted and the hot aqueous solution of SHCO was added thereto with agitation in a mechanical mixer. There resulted a smooth, stable vanishing cream.

EXAMPLE XII

Liquefying cleansing cream

| | Parts |
|---|---|
| Peach kernel oil | 30 |
| Hydroxystearic acid | 1 |
| Spermaceti | 15 |
| Oleyl alcohol | 5 |
| SHCO | 10 |
| Water | 40 |

The hydroxystearic acid was melted, the spermaceti added and heated until melted; the peach kernel oil and oleyl alcohol were then added with heating to prevent separation of any solid. The SHCO was dissolved in hot water and the resultant solution was mixed with the molten mixture of the other ingredients and agitated.

EXAMPLE XIII

Vanishing cream

| | Parts |
|---|---|
| Glyceryl monostearate | 15 |
| Stearic acid | 15 |
| SHCO | 10 |
| Tri-isopropanolamine | 1 |
| Water | 60 |

The glyceryl monostearate and stearic acid were melted together, the SHCO and tri-isopropanolamine dissolved in the water heated to the same temperature, and the solution mixed with the molten mixture of the other ingredients and agitated.

EXAMPLE XIV

Cleansing cream

| | |
|---|---|
| White wax, spermaceti, and stearyl alcohol | parts of each 5 |
| White mineral oil | parts 40 |
| SHCO | do 10 |
| Triethanolamine | do 1 |
| Water | do 40 |

The wax, spermaceti and stearyl alcohol were melted together, and the mineral oil added, maintaining sufficient heat to prevent precipitation. The SHCO and triethanolamine were dissolved in water heated to the same temperature, and the solution mixed and agitated with the molten mixture of the other ingredients.

EXAMPLE XV

Sunburn cream

| | Parts |
|---|---|
| Glyceryl monostearate | 10 |
| Petrolatum | 30 |
| SHCO | 20 |
| Water | 40 |

The glyceryl monostearate was melted and dissolved in the petrolatum, the SHCO was dissolved in the water heated to the same temperature, and the two solutions were mixed with agitation.

EXAMPLE XVI

Sulfathiazole ointment

| | Parts |
|---|---|
| Sulfathiazole | 5 |
| Diethylene glycol monostearate | 10 |
| Petrolatum | 30 |
| SHCO | 20 |
| Water | 40 |

The diethylene glycol monostearate was melted and dissolved in the petrolatum, the SHCO was dissolved in water heated to the same temperature, and the two solutions were mixed with agitation. When the cream had cooled to about 40° C., the sulfathiazole was incorporated with an equal quantity of the cream. The balance of the cream was then added and agitated until cool.

From the above discussion and examples, it will be seen that the applicant's invention provides novel ointments and ointment bases which have the property of ready application to skin and freedom from interference by secretions from the skin, in most cases forming oil-in-water emulsions, which readily penetrate these secretions. These ointment bases are of quite general application, being compatible with practically all of the medicaments and other substances ordinarily incorporated into ointments. Further, the preparation of these ointments is greatly simplified by the ready and stable compatibility of the sulfated and phosphated castor oil bases with the various other ingredients such as hydrophobic materials on the order of mineral, vegetable and animal oils, fats and waxes. The bases remain stable over long periods of time, both to rancidity and to separation of the materials contained therein.

Having described my invention what I claim as new and desire to secure by Letters Patent is:

1. A composition suitable for application to the skin selected from the group consisting of ointments and creams, comprising a substance selected from the group consisting of sulfated hydrogenated castor oil and phosphated hydrogenated castor oil having an iodine value of less than 11 and an unctuous substance selected from the group consisting of animal, vegetable and mineral oils, fats, fatty alcohols, fatty alcohol esters and waxes, the unctuous portion comprising 25% to 75% of the composition.

2. A composition suitable for application to the skin selected from the group consisting of ointments and creams, comprising sulfated hydrogenated castor oil having an iodine value of less than 4 and an unctuous substance selected from the group consisting of animal, vegetable and mineral oils, fats, fatty alcohols, fatty alcohol esters and waxes, the unctuous portion comprising 25% to 75% of the composition.

3. A composition suitable for application to the skin selected from the group consisting of ointments and creams, comprising sulfated hydrogenated castor oil having an iodine value of less than 11 and a pH value not less than 5.5 and an unctuous substance selected from the group consisting of animal, vegetable and mineral oils, fats, fatty alcohols, fatty alcohol esters and waxes, the unctuous portion comprising 25% to 75% of the composition.

4. The composition of claim 1 emulsified with 30% to 70% water.

5. The composition of claim 2 emulsified with 30% to 70% water.

6. The composition of claim 3 emulsified with 30% to 70% water.

GEORGE W. FIERO.